United States Patent
Kukla et al.

(10) Patent No.: US 10,880,655 B2
(45) Date of Patent: Dec. 29, 2020

(54) METHOD FOR OPERATING A HEARING APPARATUS SYSTEM, AND HEARING APPARATUS SYSTEM

(71) Applicant: SIVANTOS PTE. LTD., Singapore (SG)

(72) Inventors: Christoph Kukla, Forchheim (DE); Tobias Wurzbacher, Fuerth (DE); Sandro Kecanovic, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 16/444,077

(22) Filed: Jun. 18, 2019

(65) Prior Publication Data
US 2019/0387327 A1 Dec. 19, 2019

(30) Foreign Application Priority Data
Jun. 18, 2018 (DE) ........................ 10 2018 209 801

(51) Int. Cl.
*H04R 25/00* (2006.01)
*G08B 21/04* (2006.01)
*G10L 15/22* (2006.01)
*G10L 25/51* (2013.01)

(52) U.S. Cl.
CPC ......... *H04R 25/30* (2013.01); *G08B 21/0446* (2013.01); *G10L 15/22* (2013.01); *G10L 25/51* (2013.01)

(58) Field of Classification Search
CPC .. H04R 25/30; H04R 2225/41; H04R 25/305; G08B 21/0446; G08B 21/043; G08B 21/24; G10L 15/22; G10L 25/51; A61B 5/0093; A61B 5/1117
See application file for complete search history.

(56) References Cited

U.S. PATENT DOCUMENTS

| | | | |
|---|---|---|---|
| 8,873,781 B2 * | 10/2014 | Hannemann | H04R 25/45 381/320 |
| 9,596,551 B2 * | 3/2017 | Pedersen | H04R 25/407 |
| 10,313,802 B2 * | 6/2019 | Frederiksen | A61B 5/046 |
| 10,635,391 B2 * | 4/2020 | Shin | G06F 3/0346 |
| 2010/0310087 A1 * | 12/2010 | Ishida | H04R 1/1041 381/74 |

(Continued)

FOREIGN PATENT DOCUMENTS

| CN | 105913614 A | 8/2016 |
|---|---|---|
| DE | 102017201457 B3 | 5/2018 |

(Continued)

*Primary Examiner* — Oyesola C Ojo
(74) *Attorney, Agent, or Firm* — Laurence A. Greenberg; Werner H. Sterner; Ralph E. Locher (57) ABSTRACT

A method for operating a hearing apparatus system with at least one hearing apparatus uses a first sensor of the hearing apparatus to capture a first measured variable characteristic of an actual wearing situation. If the first measured variable and/or a variation over time derived therefrom satisfies at least one prescribed first criterion, it is inferred that the hearing apparatus has had a tumble. If the tumble is detected to have taken place, at least one further measured variable and/or a variation over time derived therefrom is captured, and the at least one further measured variable is used to ascertain whether the hearing apparatus is arranged on the head of a hearing device wearer after the tumble.

20 Claims, 3 Drawing Sheets

(56) References Cited

U.S. PATENT DOCUMENTS

| | | | |
|---|---|---|---|
| 2011/0135128 A1* | 6/2011 | Ura | H04R 25/50 |
| | | | 381/315 |
| 2013/0238340 A1* | 9/2013 | Walsh | H04R 1/1041 |
| | | | 704/260 |
| 2013/0343585 A1* | 12/2013 | Bennett | H04R 25/554 |
| | | | 381/315 |
| 2014/0056452 A1 | 2/2014 | Moss et al. | |
| 2015/0326965 A1* | 11/2015 | Sprague | G10L 13/00 |
| | | | 381/317 |
| 2016/0057547 A1* | 2/2016 | Burger | H04R 25/00 |
| | | | 381/315 |
| 2017/0112671 A1 | 4/2017 | Goldstein | |
| 2018/0228404 A1* | 8/2018 | Bhunia | G08B 21/0446 |
| 2018/0317837 A1* | 11/2018 | Burwinkel | G06F 3/167 |
| 2019/0268707 A1* | 8/2019 | Solum | A61B 5/4815 |

FOREIGN PATENT DOCUMENTS

| | | |
|---|---|---|
| EP | 2908459 A1 | 8/2015 |
| WO | 03098907 A2 | 11/2003 |
| WO | 2017157409 A1 | 9/2017 |

* cited by examiner

METHOD FOR OPERATING A HEARING APPARATUS SYSTEM, AND HEARING APPARATUS SYSTEM

CROSS-REFERENCE TO RELATED APPLICATION

This application claims the priority, under 35 U.S.C. § 119, of German patent application DE 10 2018 209 801.8, filed Jun. 18, 2018; the prior application is herewith incorporated by reference in its entirety.

BACKGROUND OF THE INVENTION

Field of the Invention

The invention relates to a method for operating a hearing apparatus system comprising at least one hearing apparatus. Furthermore, the invention relates to a hearing apparatus system having at least one such hearing apparatus.

A hearing apparatus is used, in particular in the form of a hearing aid device of a person with hearing loss, to at least partially compensate for the hearing loss. To this end, standard hearing apparatuses (also referred to as hearing devices, in particular in the case of hearing aid devices) regularly comprise at least one microphone for capturing sounds from the surroundings and a signal processing processor used to process the captured sounds and to boost and/or attenuate them (in particular on a frequency-specific basis) on the basis of the individual hearing loss. The processed microphone signals are forwarded from the signal processing processor to an output transducer—for the most part in the form of a loudspeaker—for output to the ear of the respective hearing device wearer. Depending on the type of hearing loss, the output transducers used are also what are known as bone conduction receivers or cochlea implants for mechanically or electrically stimulating the ear. The term hearing apparatus also covers other devices, however, such as for example headphones, "hearables", personal sound amplification products (also referred to as "PSAPs"), so-called tinnitus maskers or headsets.

During normal use of a hearing apparatus, they can sometimes also fall to the ground (subsequently referred to as "tumbling" or "a tumble"). Since such a hearing apparatus, in particular a hearing aid device, is for the most part a comparatively small device, tumble detection is useful in order to make the wearer of the hearing apparatus aware that the hearing apparatus has tumbled, for example. Another situation may alternatively be that the wearer of the hearing apparatus likewise tumbles, and hence together with said hearing apparatus. Since wearers of a hearing apparatus, in particular a hearing aid device, are frequently also older people who may also be in need of help, the most accurate possible knowledge of the actually prevailing situation is desirable. This is because if the wearer of the hearing apparatus has tumbled with the hearing apparatus and possibly needs help, he may be unable to help himself in the worst case.

SUMMARY OF THE INVENTION

The invention is based on the object of allowing improved operation of a hearing apparatus system.

With this and other objects in view there is provided, in accordance with the invention, a method for operating a hearing apparatus system having at least one hearing apparatus. The method comprising:

using at least one first sensor of the hearing apparatus to capture a first measured variable that is characteristic of an actual wearing situation;

if the first measured variable and/or a variation over time derived from the first measured variable satisfies a prescribed first criterion, inferring that the hearing apparatus has been subject to a tumble;

if the tumble is detected, capturing at least one further measured variable and/or a variation over time derived from the at least one further measured variable; and using the at least one further measured variable to ascertain whether the hearing apparatus is arranged on the head of the hearing device wearer after the tumble.

In other words, the method according to the invention is used for operating a hearing apparatus system comprising at least one hearing apparatus. According to the method, this involves a first sensor of the hearing apparatus capturing a measured variable characteristic of a present wearing situation (subsequently: "actual wearing situation"). If the measured variable and/or a variation over time derived therefrom satisfies at least one prescribed criterion, it is inferred that the hearing apparatus has had a tumble. If the tumble is detected to have taken place, at least one further measured variable and/or a variation over time derived therefrom is then captured. This at least one further measured variable is then used to ascertain whether the hearing apparatus is arranged on the head of a wearer of the hearing apparatus (subsequently referred to as "hearing device wearer" for short) even after the tumble.

That is to say that initially the first measured variable is used to ascertain whether the hearing apparatus tumbles and then detection of the tumble is followed by the at least one further measured variable being used to check whether the hearing device wearer has lost the hearing apparatus—for example before, during or after the tumble.

Characteristic means, hereinbelow, in particular that the measured variable contains qualitative information allowing explicit influence of the actual wearing situation. The measured variable can in this case directly indicate a value linked to the actual wearing situation. Alternatively, the measured variable can also contain qualitative information about the actual wearing situation, however.

The method described above advantageously allows the wearing situation linked to the tumble to be assessed better, i.e. particularly in precise comparison with "solo" detection of the tumble by the hearing apparatus. Precise assessment of this kind can in this case further advantageously form a comparatively reliable decision basis—i.e. one with a particularly low risk of misinterpretation—in respect of measures that are subsequently to be taken.

In a particularly preferred embodiment, in particular a position (arrangement) of the hearing apparatus that the hearing apparatus adopts or has adopted after the tumble is taken as a basis for a prescribed measure. That is to say that it is initially ascertained whether the hearing apparatus is arranged on the head of the hearing device wearer or at another point, for example on the ground, and this is taken as a basis for possibly reacting differently. Consequently, it is possible to identify different scenarios during or after the tumble, and to react thereto accordingly—if need be differently. In particular, the position of the hearing apparatus is thus used as a feature in order to select an appropriate measure.

In an expedient method variant, the first sensor used is an acceleration sensor. This is preferably integrated in the hearing apparatus. The acceleration sensor used in this case is preferably a "multiaxis" acceleration sensor—i.e. one sensitive in multiple measurement axes. Preferably, it is a sensor also referred to as a "3D acceleration sensor".

Expediently, the first measured variable captured in this case is an acceleration of the hearing apparatus. The first criterion used for the tumble in this case is in particular whether an acceleration component that the acceleration contains and that is indicative of gravitation—in particular a gravitation vector derivable from the applicable measurement signal of the acceleration sensor—assumes the value zero or at least is below a prescribed threshold value. This approach is based in particular on the consideration that in the event of a free fall—regardless of whether the hearing apparatus alone or the hearing device wearer with the hearing apparatus tumbles—the gravitation measured by means of the acceleration sensor is ideally completely or at least—for example on account of measurement inaccuracies—almost canceled out, since the hearing apparatus is accelerated by the same value. Consequently, a brief "loss" of (or "drop" in) the measured gravitation can form an indication of a tumble. For the threshold value, for example values close to zero, in particular approximately 0.1-0.5 g, preferably around approximately 0.3 g, are prescribed in this case.

Optionally, in developments of the method variant described above, the duration of the loss of drop in the measured gravitation is additionally taken into consideration in order to be able to distinguish this event from a sudden change, for example, or the like. By way of example, the usual duration of the free fall in the event of a tumble is estimated on the basis of the usual height of a fall—for example approximately the height of the hearing device wearer. In the case of a trampoline jump or a jump from an object to the ground, the duration of the respective free fall ought with a high level of probability to be regularly different from the usual duration in the event of a tumble. The usual duration assumed in this case (in particular on the basis of the height of the hearing device wearer) is from approximately 0.4 to 0.8 seconds, in particular from approximately 0.55 to 0.7 seconds.

In a further, optionally additional or alternative method variant, the acceleration of the hearing apparatus is examined—in particular likewise by means of the acceleration sensor—for (i.e. in respect of the first criterion) whether a variation in the acceleration of the hearing apparatuses that is characteristic of an impact is captured. That is to say that such an impact is used as an alternative or optionally further first criterion. Such an impact in the event of a tumble is expressed in a deceleration of the hearing apparatus that is found to be comparatively abrupt, and hence in a comparatively hard acceleration with the direction of the action contrary to the direction of the measured gravitation. The deceleration for a consciously performed jump ought, by contrast, with a high level of probability to achieve fewer high acceleration values, since the hearing device wearer in this case usually "absorbs", for example accomplishes gradual and preferably enduring cushioning of the kinetic energy by bending the limbs. By way of example, a tumble-related impact is detected by performing a threshold value comparison or pattern recognition over a comparatively longer period—in particular over the usual duration of a tumble, described above.

In a further expedient method variant, the first sensor used is a sensor sensitive to a change of angle of the hearing apparatus (also referred to as a "position sensor"). Optionally, the acceleration sensor described above is used in this case. Alternatively or additionally, a gyroscopic sensor referred to as a "gyro sensor" is used. As a further alternative or addition, a magnetic field sensor is used. A combination of at least two of the sensors described above is referred to here and below as an "inertial measuring unit". In this method variant, a variation in an angular position of the hearing apparatus is used for the variation derived from the first (or possibly a further captured) measured variable. This angular position of the hearing apparatus is a measure of the orientation of the hearing apparatus in space. The first criterion used for the tumble in this method variant is whether a pattern of the variation in the angular position of the hearing apparatus is sufficiently similar to at least one prescribed pattern. This prescribed pattern is preferably stored in the memory unit of the hearing apparatus, in this case as being characteristic of the tumble. By way of example, one prescribed pattern used is a slow, as seen over time, rotation of the hearing apparatus about an axis that is in particular situated significantly outside the hearing apparatus. A slow rotation of this kind—i.e. with an only slight rotational movement of the hearing apparatus—permits influence of a tumble by the hearing apparatus together with the hearing device wearer. A further pattern prescribed is optionally additionally or alternatively a comparatively fast repeated rotation of the hearing apparatus in particular about an "internal" axis—i.e. one situated inside the hearing apparatus. A similarity with a pattern permits influence of a tumble by the hearing apparatus alone in this case, for example if it is "knocked" from its intended wearing position on the head of the hearing device wearer. In this method variant, a pattern recognition method is preferably used for comparing the captured variation in the angular position of the hearing apparatus and the, possibly multiple, pattern(s).

In a further expedient method variant, an in particular additional (second) criterion used for the tumble is whether at least one of the criteria described above is repeatedly satisfied within a prescribed time window, which in particular corresponds approximately to the usual duration of a tumble described above, for example a duration of 0.5-1.5 seconds, with an interruption. This allows a kind of "jump" by the hearing apparatus to be inferred, in particular in the event of an at least semi-elastic bump, which frequently occurs with a "solar" tumble by the hearing apparatus—i.e. by the hearing apparatus alone. By way of example, it is therefore possible for a second phase of a free fall—for example after the impact described above—to be captured that is much shorter in time than the "first phase". The same also applies, mutatis mutandis, to the detection of the impact described above, which can also occur—at least in less pronounced form—a second or further time when the hearing apparatus jumps. The same also applies, mutatis mutandis, to the variation in the angular position, described above, which, after the impact by the hearing apparatus, likewise takes place for a second phase of the rotation of the hearing apparatus about a—for the most part differently oriented and arranged—axis.

In a further expedient method variant, —as an alternative or optional addition to at least one of the method variants described—the first measured variable is used to ascertain a present orientation (also: "actual orientation") of the hearing apparatus and to compare it with a standard wearing orientation. Optionally, the standard wearing orientation is ascertained on a user-specific basis, and stored as a reference value, when the hearing apparatuses are adjusted. A (optionally further) first criterion used for the tumble in this case is whether the actual orientation differs significantly from the standard wearing orientation. Significant difference is understood here and below to mean in particular that the actual orientation can be distinguished from a "slightly" shifted orientation on the head of the hearing device wearer. By way of example, the significant difference used is an inclination of the hearing apparatus in particular by more than ten degrees about at least one arbitrary axis. In this case, preferably a kind of before/after comparison of the actual orientation is therefore involved, which is preferably performed continuously or for example in comparatively short time intervals of 0.5-1.5 seconds. If the significant difference in the actual orientation from the standard wearing orientation is found, it is inferred that a tumble has taken place. If the actual orientation corresponds to the standard wearing orientation, there is therefore a high likelihood of the present actual wearing position of the hearing apparatus being the intended wearing position (in particular the head of the hearing device wearer held upright and the hearing apparatus being worn in the intended position).

In a further expedient method variant, when the tumble has taken place (i.e. been detected), the further measured variable captured by means of a loudspeaker and a microphone of the hearing apparatus, is a feedback variable characteristic of acoustic feedback, and said feedback variable, in particular a pattern derivable therefrom, is compared with a feedback reference variable stored for an intended worn state of the hearing apparatus on the head of the hearing device wearer. The feedback variable used in this case is preferably an impulse response and/or an associated frequency response in particular of the microphone in response to a test signal of the loudspeaker. If the captured feedback variable differs from the feedback reference variable by a prescribed amount, it is accordingly inferred that the intended worn state of the hearing apparatus on the head of the hearing device wearer is not present.

This comparison and hence also the captured feedback variable are used in one advantageous development to infer loss of the hearing apparatus (before, during or after the tumble) and/or a tumble by the hearing device wearer together with the hearing apparatus. As has been found, the feedback variable, in particular the impulse response or the frequency response, can be used to estimate whether the hearing apparatus is on or in the ear of the hearing device wearer as intended. Similarly, however, the feedback variable can be used to estimate whether, although the hearing apparatus is in or on the ear of the hearing device wearer as intended, it is possibly—in the present case sometimes owing to a tumble—on top of this ear. This accordingly indicates a tumble together with the hearing apparatus without loss thereof. Optionally, a tumble, together with subsequent loss of the hearing apparatus, can also be detected, in particular by virtue of an indication of the tumble, for example on detection of the loss of gravitation, resulting in capture of the feedback variable preferably being triggered repeatedly in succession. As a result, a (possibly gradual) alteration of the feedback variable in the direction of a (optionally further) feedback reference variable characteristic of an arrangement separate from the ear can be used to infer the subsequent loss of the hearing apparatus.

In a preferred embodiment—in particular independently of the variants described above for capture of the first and corresponding measured variables for detecting the tumble and/or the situation after the tumble—, the hearing apparatus system comprises two hearing apparatuses, namely preferably a right and a left hearing apparatus, which are accordingly configured and intended to be worn on the right and left ears of the hearing device wearer. Preferably, the hearing apparatus system is a binaural system in this case.

In an expedient development of the method variants described above for determination of the feedback variable, in particular in each case one applicable feedback variable is captured for both hearing apparatuses, and both captured feedback variables are used to check whether the hearing device wearer is lying on one side, in particular on the applicable ear. In this case, the two (in particular right and left) feedback variables are compared not only with the (preferably accordingly associated, i.e., in particular in the case of a first adjustment, accordingly stored) feedback reference variable but also among one another. Preferably, this check—in particular if it has already been found that the hearing device wearer is lying on one side—is continued over a prescribed period of for example at least 30 seconds, optionally up to 90 or 120 seconds. If it continues to be found over this period that the hearing device wearer is lying on his side, in particular remains lying, then in particular it is inferred that there is an increased likelihood of the hearing device wearer having injured himself. This is advantageously taken as a basis for a decision regarding the measure to be taken.

In addition or as an alternative to the check described above, for whether the hearing device wearer is lying on his side on the basis of the two (i.e. left and right) feedback variables, a comparable check is performed on the basis of the ambient sounds captured by means of the microphone of the respective left and right hearing apparatuses. In particular, the frequency spectrum of the respective captured ambient sounds is derived in this case and both frequency spectra are used to check whether for one of the two hearing apparatuses a frequency spectrum of the ambient sounds that is attenuated in comparison with the other hearing apparatus is captured. This indicates that the associated ear is covered from the surroundings and therefore is arranged close to or lying on the ground, for example. Preferably, the frequency spectrum captured by means of the respective hearing apparatus after the detected tumble is also compared with the frequency spectrum before the tumble, for example in order to rule out the ear at which the comparatively attenuated frequency spectrum is captured being covered by an item of clothing, for example. This allows the risk of a misinterpretation to be reduced.

In a further expedient method variant, the further measured variable is ascertained by using a biosensor, which is preferably inserted in at least one of the preferably two hearing apparatuses. The further measured variable captured by means of this biosensor, or the variation in said further measured variable, is in this case compared with a reference variable, or a corresponding reference variation, stored for the intended worn state of the or of the respective hearing apparatus. The term "biosensor" is understood here and below to mean in particular a sensor that uses a variable capturable by means of interaction with the body of the hearing device wearer as a measured variable. Preferably, this biosensor is used in this case to detect continuation of the interaction of the body of the hearing device wearer with the hearing apparatus and, in the absence of such interaction, accordingly to provide an indication of loss of the hearing apparatus. In particular, in comparison with the feedback measurement described above, the biosensor therefore provides a comparatively simple and, in respect of the computation complexity required, unsophisticated way of determining whether the hearing apparatus is on the head of the hearing device wearer after the tumble.

The biosensor used in this case is preferably a temperature sensor, a body-borne sound sensor, an ECG sensor, a pulse sensor and/or a capacitive sensor. The temperature sensor is for example a—(thermal-)conduction-based-resistance thermometer. Alternatively, the temperature sensor is an infrared temperature sensor (referred to as "IR temperature sensor" for short), however. The latter has the advantage that it reacts to temperature changes comparatively quickly, i.e. with a particularly short time delay. In the case of the temperature sensor, the criterion used for loss of the hearing apparatus is in particular a lowering of the recorded temperature from the body temperature. In the case of the other sensors, in particular a measurement signal that is absent or indicates a nonsensical value, for example absence of body-borne sound, absence of electrical signals or absence of a pulse signal, is used.

In particular, in order to be able to better analyze the situation of the hearing device wearer and/or of the hearing apparatus after the detected tumble, an advantageous method variant involves—after detection of the tumble—a check being performed to determine whether the present orientation—i.e. the actual orientation—of the hearing apparatus is altered within a prescribed time window after the tumble. Preferably, a check is also performed in this case to determine whether the actual orientation is altered back to the standard wearing orientation. The time window in this case is for example again a period of 30, 90 or 120 seconds after the tumble. Alteration of the actual orientation of the hearing apparatus within this period is used in this case as an indication of—if the hearing apparatus is lost—the hearing device wearer picking up the dropped hearing apparatus again or the hearing device wearer who has tumbled together with the hearing apparatus moving again himself with the hearing apparatus on his ear. A return by the hearing apparatus to its standard wearing orientation is interpreted in this case to mean that the hearing device wearer has put the hearing apparatus back on and/or has picked himself up again (possibly with the hearing apparatus, which is not lost) into his normal posture. In both cases, it is preferably inferred that the detected tumble was non-critical. Accordingly conversely, it can be inferred that—in the event of loss of the hearing apparatus before or during the tumble—the hearing device wearer has not found the hearing apparatus again and/or the hearing device wearer, who at least initially tumbled with the hearing apparatus, is himself incapable, possibly as a result of the tumble, of picking himself up again if no alteration in the actual orientation is detected.

In a particularly advantageous method variant, the prescribed measure is an emergency call being made if, after the tumble, the hearing apparatus is arranged on the head of the hearing device wearer and in particular it is found that the hearing apparatus is not moved back, in particular into the standard wearing orientation, preferably within the prescribed time window described above. The emergency call is in this case preferably transmitted by means of a communication connection of the hearing apparatus, optionally indirectly via a smartphone coupled to the hearing apparatus, a comparable electronic device or "directly" by means of a data connection of the hearing apparatus, to an applicable server or service provider. By way of example, the emergency call is transmitted as an actual emergency call (possibly in the form of an appropriate text message) to a rescue coordination center or the like in this case. Additionally or alternatively, the emergency call is transmitted as a message (in voice or text form) to a contact of the hearing device wearer (for example a related person, care personnel, a supervising doctor or the like).

The check described above to determine whether the hearing apparatus is moved and in particular moved back to its standard wearing orientation is in this case optionally performed by means of the acceleration sensor and/or the sensor sensitive to the angular position (the position sensor), for example the inertial measuring unit. Additionally or alternatively, the feedback measurement and/or analysis of the frequency spectrum of the captured ambient sounds that is/are described above can also be used. Preferably, in this case, acoustic analysis of this kind can be used to support or verify the situation captured by means of the acceleration sensor and/or the position sensor.

In a further method variant, the prescribed measure (in addition or as an alternative to the measures described above) in particular in the event of loss of the hearing apparatus is a position of the tumble, i.e. in particular a location at which the tumble occurred, being captured and being stored in memory means external to the hearing apparatus, for example in an online database or the smartphone described above. Additionally or alternatively, the lost hearing apparatus itself, the possibly second hearing apparatus of the binaural system and/or the smartphone is/are advantageously also used to output a warning signal intended to draw the hearing device wearer's attention to the loss. The storage of the position of the tumble in the storage media described above also allows later tracing, however, and hence possibly later recovery of the lost hearing apparatus.

In a preferred method variant, multiple instances of the different first measured variables described above and of the accordingly associated first criteria are used in order to improve detection of the tumble, in particular to reduce misinterpretation. Optionally, multiple instances of the first criteria are checked cumulatively in this case. As a further option, it is also possible for different instances of the first measured variables to be used for verifying the detection of the tumble by means of another first measure variable in this case, however.

In a further expedient method variant, in particular in order to further analyze the situation after the tumble, the prescribed measure in the event of detection of the tumble is the microphone of the hearing apparatus being used to capture ambient sounds from the surroundings of the apparatus and to analyze them for the presence of utterances indicative of the emergency of the hearing device wearer. By way of example, a voice analysis unit of the hearing apparatus is used in this case to analyze whether the captured ambient sounds contain calls for help, coughing, heavy breathing or the like, in particular of the hearing device wearer himself. This is preferably used to make the decision to send an emergency call in the first place, or to assist the check, described above, to determine whether the hearing apparatus is moved after the tumble. This can be advantageous when, in the event of loss of the apparatus after the tumble, the hearing device wearer lies injured on the ground close to the hearing apparatus and possibly calls for help.

Additionally or as an optional alternative, a further method variant involves the captured ambient sounds being used to check whether there are already also other (i.e. third) persons in situ, possibly in order to help the hearing device wearer. In particular, the ambient sounds are to this end analyzed for the presence of a voice (different from the voice of the hearing device wearer) of a third person (whose voice, if present, is potentially contained in the ambient sounds). If there is at least a third person in situ, the emergency call (in particular the one to a rescue coordination center) is optionally withheld or provided with the additional information that a potentially assisting person is already in situ.

In an advantageous development of the method variant described above, voice recognition is performed on the captured voice of the third person in order to detect whether assistance (for example in the form of known instructions, which are possibly also directed at further persons) being provided can be inferred from the utterances of said third person. If this is the case, the emergency call is optionally withheld, since help is already being provided or an emergency call can be made by the assisting person himself if needed.

In a further expedient method variant, the prescribed measure after detection of the tumble—in particular regardless of whether the hearing apparatus has tumbled alone or together with the hearing device wearer—is this tumble being recorded in a kind of "logbook". This logbook is in this case optionally implemented in the hearing apparatus itself or in an online database preferably provided by the manufacturer of the hearing apparatus. When a limit number for instances of the hearing apparatus being lost is exceeded, for example more closely timed monitoring measures (for example the acoustic feedback check described above) are initiated and/or the hearing device wearer is instructed to check the fit, in particular the adjustment of the hearing apparatus, and to have it improved if need be. Additionally or alternatively, in the event of the limit number being exceeded, the hearing device wearer is also instructed to have the hearing apparatus checked, for example by trained personnel, for correct operation of all components, in order to be able to detect any damage that has occurred. Optionally, the hearing apparatus itself also has a device, for example a controller, that performs a system check for operational capability of all components if the limit number has been exceeded—as a further option also in the event of any detected instance of loss.

In an optional method variant, the measured variables or criteria used for detecting the tumble are iterated or checked again, in particular if, on the basis of the second or further measured variable, the result is that the hearing apparatus continues to be arranged on the ear of the hearing device wearer. By way of example, if the drop in the acceleration in the direction of gravitation and/or the actual orientation of the hearing apparatus has/have been used to detect the tumble by the hearing apparatus—or at least to step up the likelihood of a tumble—the feedback measured variable is initially used to ascertain whether the hearing apparatus is arranged on the ear of the hearing device wearer. If the result of the check on a feedback is that the hearing apparatus is arranged on the ear, this method variant involves rechecking whether the tumble has taken place, for example on the basis of the probability value output for whether the tumble has taken place.

The hearing apparatus system according to the invention comprises at least one hearing apparatus of the type described above. This hearing apparatus and hence also the hearing apparatus system are configured to perform the method described above in particular automatically, i.e. independently.

Other features which are considered as characteristic for the invention are set forth in the appended claims.

Although the invention is illustrated and described herein as embodied in a method for operating a hearing apparatus system, and hearing apparatus system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Mutually corresponding parts and variables are provided with the same reference signs throughout the drawing figures.

DETAILED DESCRIPTION OF THE INVENTION

Figure 1:
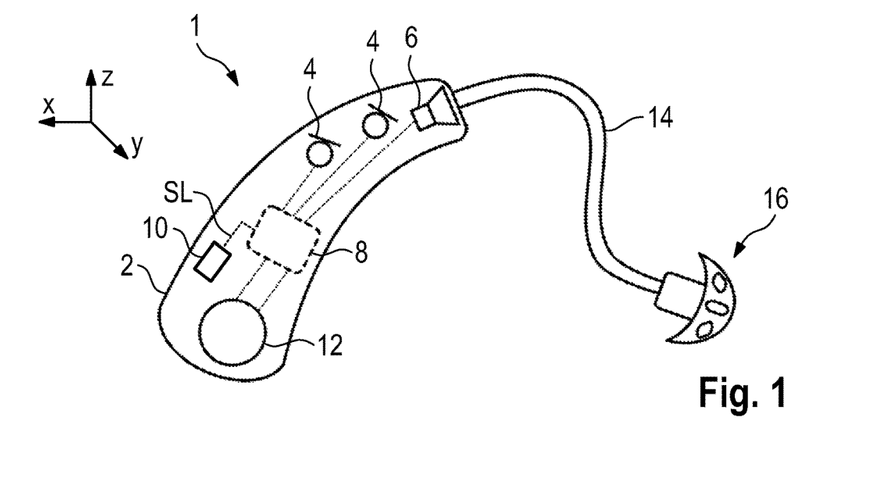
FIG. 1 is a schematic view of a hearing apparatus in the form of a behind-the-ear hearing apparatus.

Referring now to the figures of the drawing in detail and first, particularly, to FIG. 1 thereof, there is shown a schematic view of a hearing apparatus, specifically a hearing aid device (referred to as "hearing device 1" for short). The hearing device 1 has a housing 2 in which two microphones 4, a loudspeaker 6, a signal processor 8 and a position sensor 10 are arranged as electrical components of the hearing device 1. The microphones 4, the loudspeaker 6 and the position sensor 10 are linked to the signal processor 8 for signal transmission purposes. For the purpose of supplying energy to the electrical components, the hearing device 1 additionally comprises a battery 12, which is likewise arranged in the housing 2. For the purpose of conducting sound from the audible signals output by the loudspeaker 6, the hearing device 1 additionally comprises a sound tube 14, coupled to the housing 2, that is introduced into the auditory canal of the ear 16 with an ear piece 18 in the intended worn state on an ear 16 of a hearing device wearer.

Figure 4:
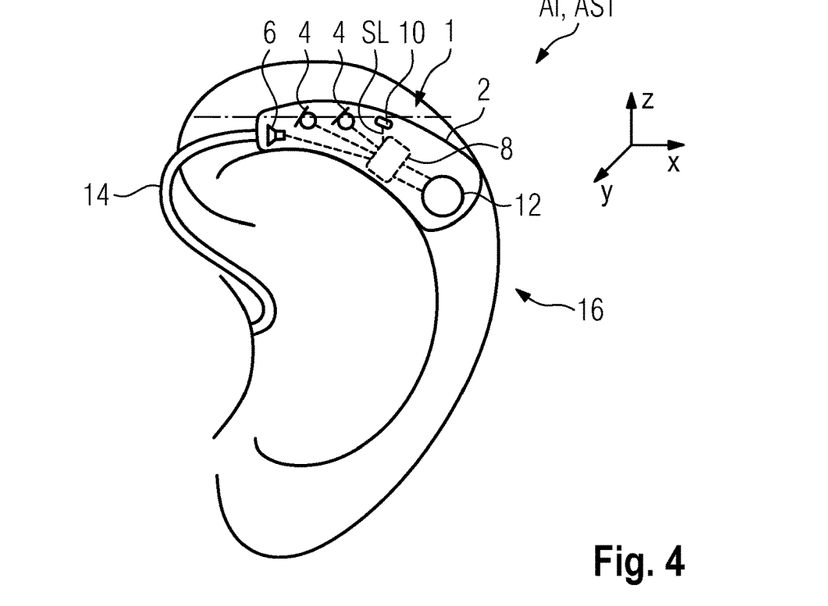
FIG. 4 shows a schematic side view of the hearing apparatus in a standard wearing orientation on the ear of a hearing device wearer.

The signal processor 8 is configured to process ambient sounds received by way of the microphones 4 on a wearer-specific basis and to output them to the loudspeaker 6 in the manner boosted and/or attenuated on a frequency-specific basis. The signal processor 8 is additionally configured to monitor the present wearing situation of the hearing device 1—i.e. whether the hearing device 1 is in its standard wearing orientation AST, as shown in FIG. 4, or in another orientation, specifically on the ear 16 at all—, specifically to detect a tumble by the hearing device 1 and/or the hearing device wearer. To this end, the signal processor 8 performs an operating method that is described more specifically below.

In a first exemplary embodiment, the position sensor 10 in this case is in the form of a 3D acceleration sensor—therefore sensitive in three different spatial directions or measurement directions—and forms a first sensor of the hearing device 1. From a position signal SL transmitted from the position sensor 10 to the signal processor 8, the signal processor 8 ascertains an acceleration az directed in the vertical direction. In a usual wearing situation (i.e. given normal posture and the hearing apparatus worn in the standard wearing orientation AST), the value of the acceleration az corresponds to gravitational acceleration or gravitation. If the measured acceleration az directed in a vertical direction falls below a threshold value close to zero, specifically at 0.3 g, the signal processor 8 concludes that the hearing device 1 is in free fall and hence at least the hearing device 1 is falling or tumbling. As the (first) criterion for detection of the tumbling of the hearing device 1, the signal processor 8 therefore uses the drop in the acceleration az to zero. The variation in the acceleration az over time is therefore used for the signal processor 8 as a feature to be evaluated.

Figure 2:
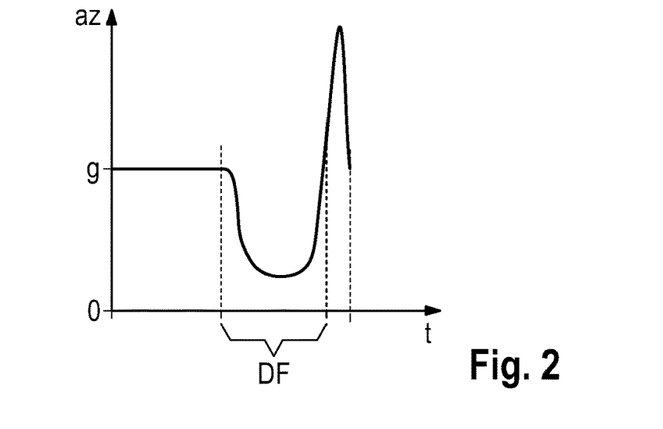
FIGS. 2 and 3 each shows a schematic graph of a first measured variable captured by way of an acceleration sensor.

To reduce misinterpretation of fluctuations in the acceleration az, the signal processor 8 checks as to whether a time for which the acceleration az drops to zero is consistent with a usual duration DF for a tumble by the hearing device wearer or the hearing device 1 from the height of the ear 16 of the hearing device wearer (cf. FIG. 2). This duration DF is set to 0.65 seconds in this case.

In an alternative or optionally additional exemplary embodiment, which is likewise explained with reference to FIG. 2, the acceleration az is used to check whether the variation in the acceleration az over time is indicative of an impact by the hearing device 1 and/or by the hearing device wearer with the hearing device 1 specifically on the ground. Such an indication exists when the acceleration az has values that are indicative of an abrupt deceleration—i.e. acceleration directed contrary to gravitation (see right-hand portion of the curve, in which the curve overshoots the value of gravitation g). In combination with the loss of gravitation g described above, the check for such a variation in the acceleration az, which is characteristic (or indicative) of the impact, is an additional (first) criterion for detection of the tumble. In combination, an additional check is performed in this case to determine whether the variation in the acceleration az that is characteristic of the impact directly follows the drop in the acceleration az to zero.

Figure 3:
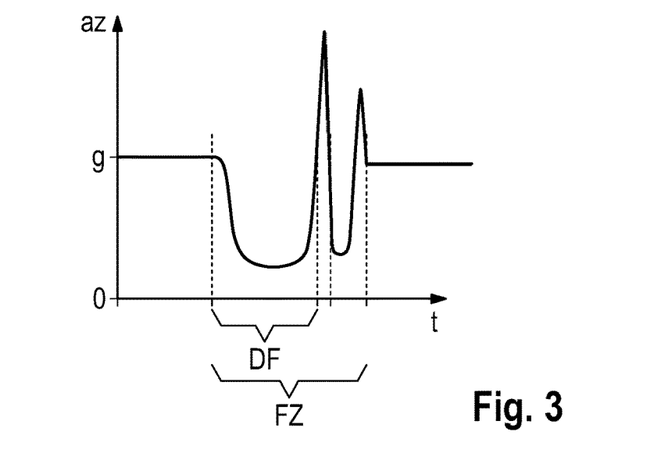

In a further exemplary embodiment, depicted with reference to FIG. 3, the signal processor 8 checks, as a "second" criterion for the tumble, whether the acceleration az satisfies the two criteria described above at least twice in succession within a prescribed time window FZ (for example 1.2 seconds). Such a pattern regularly arises when the hearing device 1 alone falls to the ground and in so doing bounces off the ground. Therefore, if this "second" criterion is satisfied, there is already an increased likelihood of the hearing device 1 alone having fallen to the ground.

Figure 5:
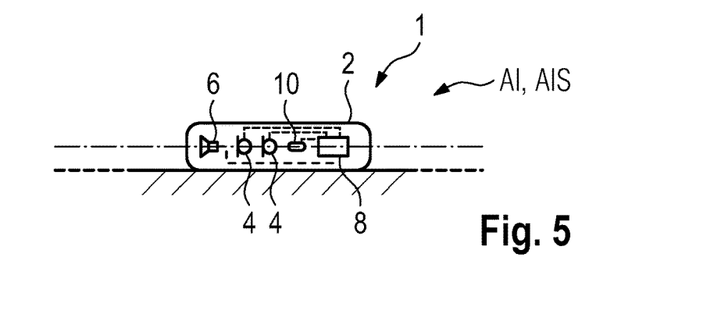
FIG. 5 shows the hearing apparatus in a different actual orientation.

In a further, additional or alternative exemplary embodiment, depicted with reference to FIGS. 4 and 5, the signal processor 8 uses the position signal SL to ascertain a present actual orientation AI of the hearing device 1 as a measured variable. In this exemplary embodiment, the position sensor 10 is formed by an inertial measuring unit that comprises the 3D acceleration sensor described above and a gyroscopic sensor. As a result, the actual orientation AI of the hearing device 1 can be ascertained particularly easily. The signal processor 8 compares the actual orientation AI with a standard wearing orientation AST (depicted in FIG. 4). If the actual orientation AI differs significantly from the standard wearing orientation AST, the signal processor 8 infers a high likelihood of the hearing device 1 possibly having tumbled together with the hearing device wearer. If the signal processor 8 detects from the position signal SL that the hearing device 1—as depicted in FIG. 5—is lying on one side of the housing 2 (specifically the actual orientation AI is greater than the standard wearing orientation AST by more than 10 degrees), the signal processor 8 infers that the hearing device 1 is arranged outside the ear 16 and, at least after the tumble, has fallen from the ear 16. This positional orientation of the hearing device 1 separate from the ear 16 is subsequently referred to as "separate orientation AIS".

Figure 6:
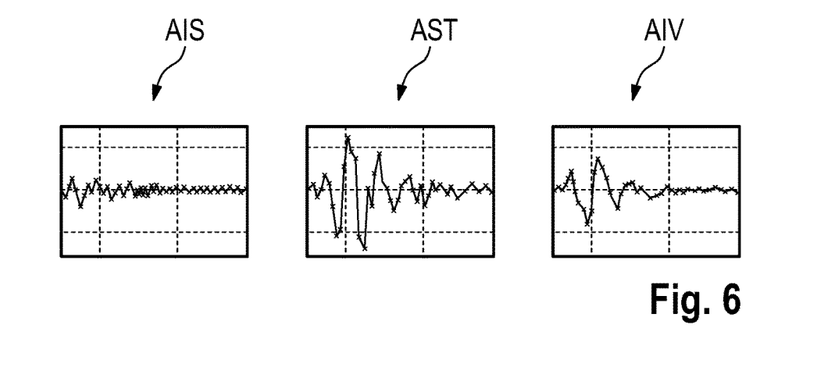
FIGS. 6 and 7 each shows a feedback variable for a hearing apparatus arranged outside and worn as intended or on the ear, but covered.

If the signal processor 8 has detected the tumble by the hearing device 1 possibly together with the hearing device wearer, the signal processor 8 ascertains a further measured variable in order to establish whether the hearing device 1 is (still) arranged on the ear 16 of the hearing device wearer. To this end, the signal processor 8 uses the loudspeaker 6 to transmit a test signal and captures said test signal by means of the microphones 4 as a feedback signal. From the captured microphone signal (i.e. the feedback signal), the signal processor 8 then ascertains an impulse response of the feedback signal (see FIG. 6). The impulse response is a feedback variable and in this case is used as a feature in order to ascertain the worn state of the hearing device 1. Specifically, the signal processor 8 performs a pattern comparison between the captured impulse response and impulse responses stored for different worn states. In FIG. 6, the impulse response for the separate orientation AIS of the hearing device 1 is depicted on the left-hand side and the impulse response for the standard wearing orientation AST is depicted in the middle. The right-hand side of FIG. 6 depicts the impulse response for a scenario in which, although the hearing device 1 is arranged on the ear 16 of the hearing device wearer as intended, the hearing device 1 is concealed from the surroundings. This state is referred to as concealed orientation AIV. The impulse response for this concealed orientation AIV is characteristic of the situation that the hearing device wearer has not lost the hearing device 1 in the tumble, but is lying on his ear 16.

Figure 7:
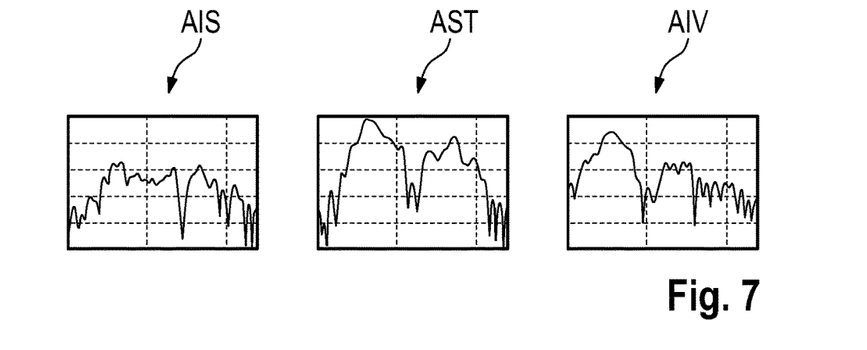

In a further exemplary embodiment, depicted with reference to FIG. 7, the signal processor 8 ascertains a frequency response of the feedback signal instead of the impulse response. The approach shown in FIG. 7 otherwise corresponds to that shown in FIG. 6.

In a further exemplary embodiment, not depicted more specifically, the hearing device 1 is part of a binaural hearing device system. In this case, the impulse responses or frequency responses of the left and right hearing devices 1 are compared with one another. If the impulse response or frequency response of one hearing device 1 is indicative of the standard wearing orientation AST, whereas that of the other hearing device 1 represents the concealed orientation AIV, the signal processor 8 steps up the likelihood of the hearing device wearer having tumbled without loss of both hearing devices 1 and lying on one of his two ears 16.

In a further exemplary embodiment, not depicted more specifically, the comparison of the frequency responses between both hearing devices 1 described above is performed by capturing the ambient sounds by means of both hearing devices 1 and deriving the respective frequency spectra. If it is found for one of the two hearing devices 1 that the frequency spectrum is attenuated in comparison with the other hearing device 1, the likelihood of the hearing device wearer lying on one of his two ears 16 is likewise stepped up.

Figure 8:
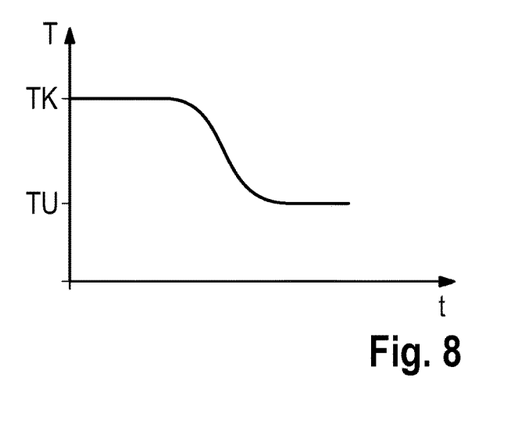
FIG. 8 shows a variation in a temperature in a view as shown in FIG. 2.

FIG. 8 depicts a further exemplary embodiment for how the signal processor 8 ascertains whether the hearing device 1 is arranged separately from the ear 16 of the hearing device wearer after the tumble. To this end, the hearing device 1 has a temperature sensor, also referred to as a "biosensor", in a manner not depicted more specifically. The temperature sensor is used to capture the temperature T at a point on the hearing device 1 of which the hearing device 1 is in contact with the body of the hearing device wearer in the intended worn position. While the hearing device 1 is thus arranged on the ear 16, the temperature value captured by means of the temperature sensor therefore corresponds at least approximately to a body temperature TK. If, during or after the tumble is detected, the captured temperature value drops, for example to an ambient temperature TU, the signal processor 8 uses this as an indication that the hearing device 1 is no longer arranged on the body, specifically on the ear 16, of the hearing device wearer.

Figure 9:
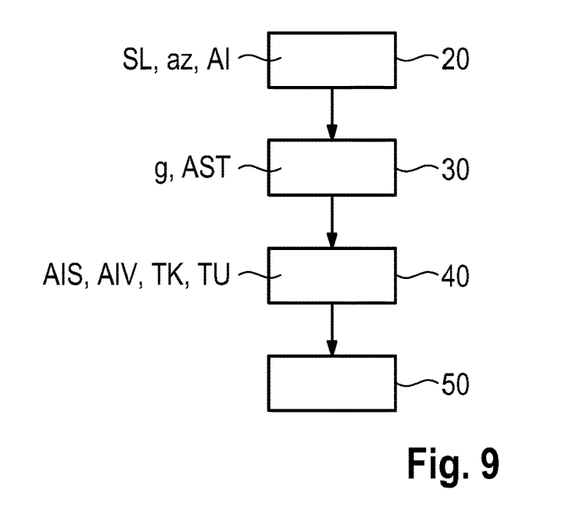
FIG. 9 shows a schematic flowchart for a method for operating the hearing apparatus.

FIG. 9 depicts a schematic sequence for the operating method. In a first method step 20, the signal processor 8 uses the position signal SL to ascertain the acceleration az and/or the actual orientation AI. In a subsequent second method step 30, the signal processor 8 uses these measured variables to ascertain whether the acceleration AZ corresponds to gravitation g or differs therefrom in a manner described above, or whether the actual orientation AI differs from the standard wearing orientation AST. In this case, the signal processor 8 makes the decision—or at least steps up a likelihood—about whether a tumble has taken place.

In a method step 40, the signal processor 8 ascertains, in a manner described above, whether the or the respective hearing device 1 is still arranged on the ear 16 of the hearing device wearer.

In a further exemplary embodiment, the signal processor additionally ascertains, in method step 40, whether anything changes about the present situation of the hearing device 1 by specifically continuing to consider the actual orientation AI for a prescribed period of one minute. If no change occurs, the signal processor 8 steps up the likelihood of the hearing device wearer having lost the hearing device 1 and not finding it again, or of the hearing device wearer being unable, owing to an injury, to change his situation. To support the decision regarding an injury to the hearing device wearer, the signal processor 8 uses the analysis, described above, of the impulse or frequency response or of the frequency spectrum of the ambient sounds over a period of appropriate length following the tumble. Since the impulse or frequency response in the frequency spectrum provide information regarding whether the hearing device 1 is still arranged on the ear 16 of the hearing device wearer, it is therefore possible to estimate comparatively and accurately whether the hearing device wearer continues to lie on the ground with the hearing device 1 arranged on his ear 16, without substantially moving. This would suggest a comparatively serious injury to the hearing device wearer.

In a further method step 50, the signal processor 8 takes a measure prescribed for the detected situation of the hearing device 1 or the hearing device wearer. If the hearing device 1 alone has tumbled, the signal processor 8 uses a data interface, not depicted more specifically, to send information about the location of the tumble to the smartphone of the hearing device wearer, which has a data connection to the hearing device 1. The location of the tumble is optionally ascertained by the signal processor 8 using an associated position sensor or alternatively using location information provided by the smartphone.

If it is found that the hearing device wearer has tumbled with the hearing device 1 and also does not move over a comparatively long period, the signal processor 8 uses the smartphone described above to output an emergency call—for example to an emergency call coordinate center or to relatives of the hearing device wearer stored in the smartphone.

The subject matter of the invention is not restricted to the exemplary embodiments described above. Rather, further embodiments of the invention can be derived from the description above by a person skilled in the art. In particular, the individual features of the invention described on the basis of the various exemplary embodiments and the configuration variants of said invention can also be combined with one another in another manner.

The following is a summary list of reference numerals and the corresponding structure used in the above description of the invention:

1 Hearing device
2 Housing
4 Microphone
6 Loudspeaker
8 Signal processor
10 Position sensor
12 Battery
14 Sound tube
16 Ear
18 Ear mold
20 Method step
30 Method step
40 Method step
50 Method step
AI Actual orientation
AST Standard wearing orientation
AIS Separate orientation
AIV Concealed orientation
az Acceleration
DF Duration
FZ Time window
g Gravitation
SL Position signal
T Temperature
TK Body temperature
TU Ambient temperature

The invention claimed is:

1. A method for operating a hearing apparatus system with at least one hearing apparatus, the method comprising:
using at least one first sensor of the hearing apparatus to capture a first measured variable that is characteristic of an actual wearing situation;
if the first measured variable and/or a variation over time derived from the first measured variable satisfies a prescribed first criterion, inferring that the hearing apparatus has been subject to a tumble;
using the first measured variable to ascertain a present orientation of the hearing apparatus and to compare the present orientation with a standard wearing orientation, and using as a criterion for the tumble whether the present orientation differs significantly from the standard wearing orientation;
if the tumble is detected, capturing at least one further measured variable and/or a variation over time derived from the at least one further measured variable;
if the tumble is detected to have taken place, checking to determine whether the present orientation of the hearing apparatus is altered and returned to the standard wearing orientation within a prescribed time window after the tumble; and
using the at least one further measured variable to ascertain whether the hearing apparatus is arranged on the head of the hearing device wearer after the tumble.

2. The method according to claim 1, which comprises taking a position of the hearing apparatus after the tumble as a basis for taking a prescribed measure.

3. The method according to claim 1, wherein the first sensor is an acceleration sensor and the first measured variable is an acceleration of the hearing apparatus, and wherein the first criterion used for the tumble is whether an acceleration component contained in the acceleration and being indicative of gravitation assumes the value zero or at least lies below a prescribed threshold value.

4. The method according to claim 1, wherein the first sensor is an acceleration sensor and the first measured variable is an acceleration of the hearing apparatus, and wherein the first criterion used for the tumble is whether a variation in the acceleration of the hearing apparatus is captured that is characteristic of an impact.

5. The method according to claim 1, wherein the first sensor is a sensor that is sensitive to a change of angle of the hearing apparatus and the variation that is derived from the first measured variable is a variation in an angular position of the hearing apparatus, and wherein the first criterion used for the tumble is whether a pattern of the variation in the angular position of the hearing apparatus is sufficiently similar to at least one prescribed pattern.

6. The method according to claim 1, which comprises using a second criterion for the tumble, the second criterion being whether the first criterion, or at least one of a plurality of first criteria, is repeatedly satisfied within a prescribed time window with interruption.

7. The method according to claim 1, which comprises, on occasion of the tumble, capturing the further measured variable by way of a loudspeaker and a microphone of the hearing apparatus as a feedback variable characteristic of acoustic feedback, and comparing the captured feedback variable with a feedback variable stored for an intended worn state, and inferring from a prescribed difference result that the intended worn state is not present.

8. The method according to claim 7, which comprises using the captured feedback variable to infer loss of the hearing apparatus and/or a tumble by the hearing device wearer together with the hearing apparatus.

9. The method according to claim 7, wherein the hearing apparatus system comprises right and left hearing apparatus, and which comprises using two feedback variables captured for the respective hearing apparatus to check whether the hearing device wearer is lying on one side.

10. The method according to claim 1, wherein the hearing apparatus system comprises right and left hearing apparatus each having a microphone for capturing ambient sounds, and which comprises ascertaining in each case one frequency spectrum of the captured ambient sounds for both hearing apparatuses, and using the frequency spectra check whether the hearing device wearer is lying on one side.

11. The method according to claim 1, which comprises ascertaining the further measured variable by using a biosensor, and comparing the further measured variable or a variation therein with a stored reference variable representing an intended worn state or a reference variation.

12. The method according to claim 11, wherein the biosensor is a device selected from the group consisting of a temperature sensor, a body-borne sound sensor, an ECG sensor, a pulse sensor, and a capacitive sensor.

13. The method according to claim 1, which comprises, if the tumble is detected to have taken place, checking to determine whether the present orientation of the hearing apparatus is altered and returned to the standard wearing orientation within a prescribed time window after the tumble.

14. The method according to claim 1, which comprises causing an emergency call to be made if, after the tumble, the hearing apparatus is arranged on the head of the hearing device wearer and the hearing apparatus is not being moved.

15. The method according to claim 1, which comprises, in the event of a loss of the hearing apparatus, capturing a position of the tumble and stored the position in memory external to the hearing apparatus, and/or outputting a warning signal.

16. The method according to claim 1, which comprises, on occasion of a tumble, capturing ambient sounds by way of a microphone of the hearing apparatus and analyzing the ambient sounds for a presence of utterances that are indicative of an emergency.

17. The method according to claim 1, which comprises, on occasion of a tumble, capturing ambient sounds by way of a microphone of the hearing apparatus and analyzing the ambient sounds for a presence of a voice of a third person.

18. The method according to claim 17, which comprises performing speech recognition on the voice of the third person in order to detect whether assistance being provided can be inferred from the utterances of the third person.

19. A hearing apparatus system, comprising at least one hearing apparatus that is configured to perform the method according to claim 1.

20. A method for operating a hearing apparatus system with at least one hearing apparatus, the method comprising:
using at least one first sensor of the hearing apparatus to capture a first measured variable that is characteristic of an actual wearing situation;
if the first measured variable and/or a variation over time derived from the first measured variable satisfies a prescribed first criterion, inferring that the hearing apparatus has been subject to a tumble;
if the tumble is detected, capturing at least one further measured variable and/or a variation over time derived from the at least one further measured variable; and
using the at least one further measured variable to ascertain whether the hearing apparatus is arranged on the head of the hearing device wearer after the tumble; and
on occasion of a tumble, capturing ambient sounds by way of a microphone of the hearing apparatus and analyzing the ambient sounds for a presence of a voice of a third person, and performing speech recognition on the voice of the third person in order to detect whether assistance being provided can be inferred from the utterances of the third person.

* * * * *